United States Patent
Grape et al.

(10) Patent No.: US 8,655,627 B2
(45) Date of Patent: Feb. 18, 2014

(54) DETERMINING A DISTRIBUTION OF MULTIPLE LAYERS OF A COMPOSITE MATERIAL WITHIN A STRUCTURAL VOLUME

(75) Inventors: Johan Arendt Grape, Boxborough, MA (US); Steven Christopher Luby, Brookline, MA (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 400 days.

(21) Appl. No.: 12/916,782

(22) Filed: Nov. 1, 2010

(65) Prior Publication Data

US 2012/0109594 A1    May 3, 2012

(51) Int. Cl.
*G06F 17/50*    (2006.01)

(52) U.S. Cl.
USPC .................................... 703/1; 700/98

(58) Field of Classification Search
USPC ........................................................ 703/1
See application file for complete search history.

(56) References Cited

U.S. PATENT DOCUMENTS

| | | | | |
|---|---|---|---|---|
| 4,849,913 A * | 7/1989 | Ward et al. | | 700/98 |
| 5,006,990 A * | 4/1991 | Ward et al. | | 700/97 |
| 5,038,291 A * | 8/1991 | Wang et al. | | 700/98 |
| 5,984,511 A * | 11/1999 | Vasey-Glandon et al. | | 703/6 |
| 7,010,472 B1 | 3/2006 | Vasey-Glandon et al. | | |
| 7,243,055 B2 * | 7/2007 | Chen et al. | | 703/2 |
| 7,809,531 B2 * | 10/2010 | Murrish | | 703/1 |
| 8,181,345 B2 * | 5/2012 | Carpentier et al. | | 29/889.2 |
| 8,306,789 B2 * | 11/2012 | Krog | | 703/1 |
| 2008/0312764 A1 | 12/2008 | Murrish | | |
| 2011/0054850 A1 * | 3/2011 | Roach | | 703/1 |
| 2011/0129348 A1 * | 6/2011 | Parkin et al. | | 416/230 |

OTHER PUBLICATIONS

Skinner, Michael, "New Applications and Approaches Expand Market for Composite Software", Reinforced Plastics, Jun. 2006).*
Klintworth, John, "Evolving Composites Modeling and Simulation Requirements and Solutions", MCS Software Limited, 2001.*
PCT Search Report dated Jun. 11, 2013, for Appl. No. PCT/US2011/058722 (12 pages).
Prakash, "Autolay—GUI-based Design and Development software for Laminated composite Components", Computers and Graphics, Elsevier, GB, vol. 23, No. 1, Feb. 1, 1991, pp. 95-110 (Abstract) (2 pages).

* cited by examiner

Primary Examiner — Mary C Jacob (57) ABSTRACT

Apparatus and methods for designing multilayer structures are described. The multilayer structures may be of simple or complex shapes having a volume to be filled by multiple layers of composite material. The composite material may include fiber/polymer composites. The methods facilitate distribution and reordering of layers within the multilayer structure during the design phase. Dimensional data for each layer within the structure may be provided as output data and used to cut "flat" patterns for each layer. The methods and apparatus can accelerate design and development of high-strength, composite multilayer structures.

37 Claims, 6 Drawing Sheets

DETERMINING A DISTRIBUTION OF MULTIPLE LAYERS OF A COMPOSITE MATERIAL WITHIN A STRUCTURAL VOLUME

FIELD OF THE INVENTION

The invention relates to methods and apparatus for designing structures fabricated from multiple layers of materials, e.g., multiple layers of composite materials. More particularly, the invention pertains to determining a distribution of multiple layers of materials to fill a structural volume.

BACKGROUND

Today, many manufactured products in the automotive, aerospace, wind energy, marine vessel, and defense technologies may include structures fabricated from multilayer composite materials. When properly designed and fabricated, multilayer composite structures can outperform structures fabricated by conventional methods, e.g., by bending, machining, and fastening pieces, or by milling a structure from a single material. A multilayer composite structure can provide superior durability and strength-to-weight ratio over structures fabricated by conventional methods. Composite structures can provide additional benefits over traditional structures depending on the particular application, because composite structures can be tailored to meet specific demands of a particular application.

Designing and fabricating a structure comprising multiple layers of composite material may pose engineering challenges. Current computer-aided design (CAD) tools are well adapted for providing dimensional data to aid in traditional design and manufacture of structures, e.g., providing renderings with dimensional data to guide the milling of a piece. However, CAD tools are not well adapted for providing data to guide the fabrication of a structure from multiple layers of composite material.

Add-on tools have been developed to extend the capabilities of CAD tools, so that they may be used for designing composite structures. Vistagy, Inc. of Waltham, Mass. provides several add-on tools, such as the product FiberSIM®, which can add fiber-composite multilayer design functionality to CAD software packages. Such add-on tools have been used in conjunction with the CAD tools by design engineers to facilitate development of a conceived multilayer structure into a commercial product. However, even with such tools, the design of multilayer composite structures can be difficult and computationally intensive. Typically, it is not known beforehand how large each layer should be and how layers of different sizes should be distributed within the structure's volume. Often, layers are distributed in successive trial-and-error layouts, with data being recalculated for each trial. Numerous iterations may be required before an acceptable distribution of layers is identified.

SUMMARY

The inventors have recognized and appreciated that designing multilayer structures, such as those manufactured from composite materials, is challenging in part because the task of determining a distribution of multiple layers of composite materials within a three-dimensional structure to be fabricated can be time consuming. Current processes used for defining layers to fill a structure can be highly manual, require extensive cad modeling skills, and require considerable amounts of computer storage as well as a powerful computer. Further, current processes can be error prone and unlikely to produce accurate and reproducible results. The inventors recognize that it can be quite difficult to determine how the volume of the structure is to be filled with multiple layers when a large number of layers are required, the shape of the structure is non-trivial, and there may be one or more design and/or performance constraints placed on the structure. To overcome the difficulties associated with multilayer design, the inventors have devised methods and apparatus to aid in determining a distribution of multiple layers of composite material within a design structure. Computational methods are developed which can efficiently distribute and reorder layers within the structure during a design phase. The reordering, or "shuffling," of layers may be carried out to meet certain design and/or performance constraints.

In certain embodiments, layer transformation guides are defined for a contemplated composite structure and isocontours are computed on two surfaces of the structure. The layer transformation guides may extend from an isocontour on one surface to a corresponding or paired isocontour on the other surface. The layer transformation guides may be used to approximate the size and shape of any layers which are moved or relocated within the multilayer stack that fills the structure. The methods and apparatus may provide output layer configuration data representative of the dimensions and configurations of each layer within the structure, and may be used to rapidly provide alternative distributions of the multiple layers. In some implementations, "flat-pattern" data is provided for guiding the cutting each of the layers from a flat sheet of material. In various embodiments, the methods and apparatus are used in conjunction with CAD tools.

In exemplary embodiments, a method for designing a multilayer structure may be executed by at least one processor adapted to carry out process steps comprising (a) receiving design data defining dimensions of the multilayer structure, (b) receiving parameter data defining at least one layer parameter of at least one layer of multiple layers to form the multilayer structure, and (c) calculating at least one layer transformation guide, wherein the layer transformation guide identifies at least one configuration parameter of the at least one layer disposed at any one of a plurality of locations within the multilayer structure. The processor may be further adapted to execute steps for (d) receiving instructions to relocate the at least one layer within the multilayer structure, and (e) determining layer configuration data for the at least one layer based on the instructions to relocate and the at least one layer transformation guide. Layer configuration data may comprise data stored in at least one manufactured data storage device representative of a three-dimensional shape or surface of a layer.

Inventive embodiments further include a non-transitory computer storage medium encoded with computer-executable instructions, such that when executed the computer-executable instructions adapt an apparatus to execute process steps for designing a multilayer structure. The process steps that are executed by the apparatus may comprise dividing an outer bounding surface of the multilayer structure into at least a first surface portion and a second surface portion, and calculating data representative of at least one layer transformation guide wherein the at least one layer transformation guide extends from the first surface portion to the second surface portion. The at least one layer transformation guide may identify plural configuration parameters of at least one layer of the multilayer structure, and each of the plural configuration parameters may correspond to one of plural locations of the at least one layer within the multilayer structure. The process steps that are executed by the apparatus may further comprise defining data representative of pairs of isocontours on the first surface portion and the second surface portion, wherein each isocontour on the first surface portion is associated with a corresponding isocontour on the second surface portion and each pair defining loci of constant distances between the first surface portion and the second surface portion. An additional process step executed by the apparatus may include calculating a three-dimensional shape of the at least one layer for any one or more of the plurality of possible locations of the at least one layer within the multilayer structure. In various embodiments, the apparatus that executes the process steps comprises at least one processor configured to access at least one non-transitory storage medium, and the multilayer structure may comprise plural layers of composite material.

An additional embodiment includes a method for designing a multilayer structure comprising plural layers of composite material in which the composite structure is subdivided into multiple sub-volumes. The method may be executed by a multilayer design tool having at least one processor, which may be in communication with at least one storage medium. The processor may be adapted to carry out process steps comprising (a) partitioning a shape representative of the multilayer structure into plural sub-volumes, (b) calculating a plurality of layer transformation guides for each one of the plural sub-volumes, wherein each layer transformation guide is associated with one layer of the multilayer structure. The at least one processor may be further adapted for receiving instructions to relocate a selected layer within one of the plural sub-volumes, and determining layer configuration data for all layers moved within the one of the plural sub-volumes responsive to the relocation of the selected layer. The determining of layer configuration data may be based on the instructions to relocate the selected layer and on the layer transformation guides associated with the layers moved. The determining may further comprise reusing layer configuration data computed for a prior distribution of layers within the multilayer structure.

The foregoing summary can be more fully understood from the following description considered in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated, simplified, reduced or enlarged to facilitate an understanding of the invention. The number of elements in a drawing may be more than, or less than, the number of elements used in an embodiment of the invention. The drawings are not necessarily to scale, emphasis instead being placed upon illustrating the principles of the teachings. In the drawings, like reference characters generally refer to like features, functionally similar and/or structurally similar elements throughout the various figures. The drawings are not intended to limit the scope of the present teachings in any way.

The features and advantages of the present invention will become more apparent from the detailed description set forth below when taken in conjunction with the drawings.

DETAILED DESCRIPTION

Overview

In brief, embodiments of the invention are directed to methods and systems for determining a distribution of and layer configuration data for multiple layers, such as composite material or any suitable deformable and/or conformable material, to fill a structure being designed and fabricated. The structure may be a component of a manufactured product, e.g., a door panel for an automobile, an aerodynamic support strut for an aircraft, a cowling or structural panel for a jet, a blade of a wind turbine. In various embodiments, the structure comprises a volume that is to be filled with multiple layers of composite material according to a determined distribution. Since each layer can be thin, a significant number of layers may be required to fill the volume of a designed structure. In various implementations, design and/or performance constraints may be associated with the structure, and these constraints may contribute to the determination of the distribution of layers for fabricating the structure. A multilayer design tool, comprising at least one processor, may be adapted to carry out process steps described below for determining the distribution of the multiple layers for filling the structure in compliance with design rules and/or performance constraints.

Design data representative of a composite structure may be entered into the multilayer design tool, or created with a computer-aided design (CAD) tool and provided to the multilayer design tool via an application programming interface. The multilayer design tool may receive design data defining dimensions and shape of the structure, and may further receive layer data defining at least one parameter of each layer that will be used to fill the contemplated structure. The multilayer design tool may use the design data and layer data to calculate isocontours and layer transformation guides for the structure. In various embodiments, the isocontours are defined on outer surfaces of the structure. An isocontour may specify a boundary of a layer corresponding to the isocontour. Layer transformation guides may be determined from the isocontours in some embodiments, and may be calculated interdependently with the isocontours in some embodiments. A layer transformation guide can be used to specify a boundary of a layer or layer dimensions as the layer is moved or shuffled within the structure. A layer transformation guide may also be used to determine configuration data of one or more layers within the multilayer structure.

Once a first layer distribution is determined for a structure, the layer transformation guides may be used by the multilayer design tool to move one or more layers within the multilayer stack, and serve as an aid in calculating new layer configurations. New layer configurations that result from the shuffling of one or more layers may readily be calculated using the method steps described herein. Additionally, data from a prior layer-configuration calculations may be recycled and used to obtain layer configuration data for a new layer distribution. Further details and additional aspects of the invention are described below.

Description of the Problem

Figure 1A:
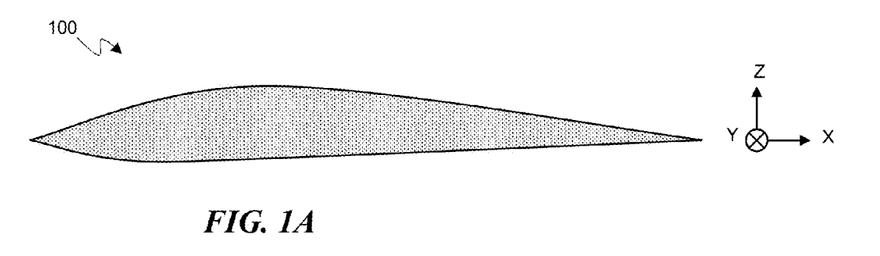
FIG. 1A depicts an elevation view, in cross section, of a structure to be fabricated from multiple layers of composite materials. The illustrated structure 100 is chosen for teaching purposes only, but a contemplated structure to be designed may be any shape.
Figure 1B:
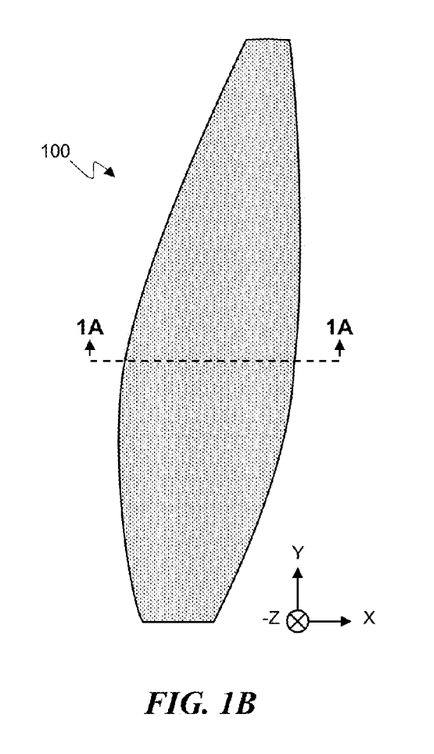
FIG. 1B depicts a plan view of the structure of FIG. 1A.

By way of introduction reference is now made to FIGS. 1A and 1B, which depict an embodiment of a structure 100 to be designed and fabricated using multiple layers of composite material. The structure 100 may be an aerodynamic or fluid dynamic strut. The composite structure may have any three-dimensional shape, and be characterized by a plurality of dimensions and/or shape data. For example, certain dimensions of the structure 100 may be specified and curvature data and/or equations provided, all of which defines the three-dimensional structure. For the illustration of FIG. 1, the structure has an airfoil shape in cross section (XZ plane), as shown in FIG. 1A, and an extended, swept oblong shape along a length of the structure in the Y direction, as shown in FIG. 1B. The cross-sectional shape may change in any manner along the length of the structure. Further, the composite structure 100 may be twisted and/or curved along its length in the Y direction.

The term "composite structure" may be used herein to refer to a structure to be designed and fabricated using multiple layers of composite material or any suitable material that may deform and/or conform to shapes for filling a multilayer structure. The structure of FIG. 1 is selected for teaching purposes only. In practice, the structure may have any shape. The layers of a composite structure may not be of the same composition. For example, some layers may be a composite material of a first composition and thickness, and some layers may be a composite material of a second composition and same or different thickness. In some implementations, a composite structure may comprise a mixture of composite layers (e.g., layers of a polymer/fiber composition) and non-composite layers (e.g., layers of a polymer or metallic sheet).

Figure 2A:
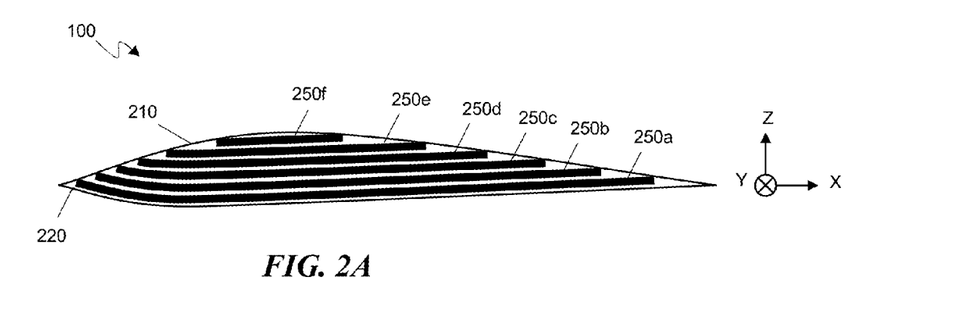
FIG. 2A depicts an elevation view of the composite structure of FIG. 1A filled with multiple layers of composite material. This depiction shows that the multiple layers were placed within the structure starting at a second surface 220 and filling to a first surface 210.

In a traditional method of manufacturing, the structure 100 might be manufactured from a solid piece of material, e.g. milled from a solid block of material. However, such a method does not utilize the advantages that multilayer composites can offer, such as improved strength-to-weight, durability, reduced waste, and tailored performance characteristics. Although multilayer composites can provide a number of improvements over conventional manufacturing processes, multilayer design and fabrication can pose several engineering challenges, e.g., choice of material, choice layer properties, layer dimensions, and distribution of layers within the composite structure. FIG. 2A depicts an example of layers distributed within the structure 100. Few layers 250$a$-$f$ are shown in the illustration to simplify the drawings. In practice, some composite structures may be comprised of 10's or 100's of layers, and layer properties may differ throughout the structure.

Each layer of the composite material in a finished structure 100 may comprise, for example, high-strength fiber embedded in a hardened resin. Other suitable compositions for the composite material may be used including, without limiting the scope of the invention, composites comprising any one or more of the following elements: glass fiber, carbon fiber, boron fiber, ceramic matrix, epoxy, polyester, dry woven fiber, pre-impregnated woven fiber, infused woven fiber. As one example, while a structure is being fabricated, the resin may not be hardened or may not be present. For example, the resin may be in a liquid or gel form and a hardener added after a layer is positioned in the structure. In some cases, the resin and hardener may be added after some fabric is positioned in the structure. In some embodiments, the resin and hardener may be premixed and present with the fabric or applied subsequently, yet require a cure time, e.g., between about 5 minutes and about 24 hours, to solidify the structure. When a resin/hardener mix is applied subsequently to a structure, the mix may be forced into the multilayer structure under pressure or vacuum. The fiber may be a glass-based fiber, Kevlar, a carbon fiber, or any other similar material, and the hardened resin may be an epoxy-based resin, a polymer, a glass/polymer or carbon fiber/polymer composite. In some embodiments, the carbon fiber or carbon fiber/polymer composite comprises carbon nanotubes. When a structure 100 is fabricated, it may be assembled in a "lay-up" process in which each layer is positioned and added successively to the structure. In some cases, portions of a structure may be laid-up with multiple layers of composite material, and then the portions bonded together.

In view of the various types of materials and assembly methods available for composite structures, it may be appreciated that manufacturing a structure 100 from multiple layers of composite material can provide significantly greater flexibility in meeting design and performance specifications with a finished product. For example, flexural and mechanical properties of the composite structure may be tailored by selecting an orientation of a fabric, weave of fabric, fabric type, and/or resin type within each of the layers within the structure. Further, the way layers are configured and/or distributed within the structure 100 can affect the flexural and mechanical properties of the composite structure.

Figure 2B:
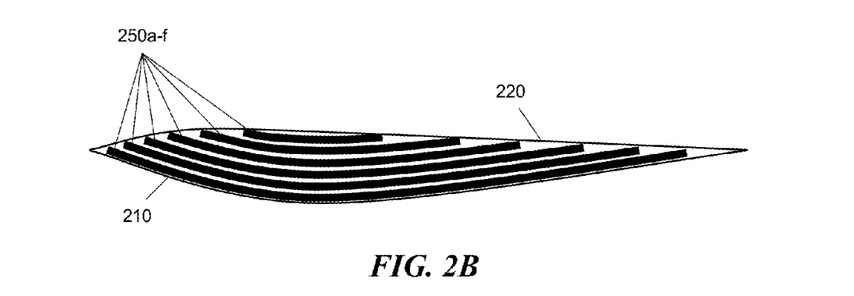
FIG. 2B depicts an elevation view of the composite structure of FIG. 1A in which multiple layers were placed within the structure starting at the first surface 210 and filling to the second surface 220. The placement of layers in FIGS. 2A-2B may be representative of the way the composite material is "laid up" during fabrication of the structure 100.

FIGS. 2A-2B depict alternative distributions of multiple layers 250$a$-$f$ of composite material within the structure 100. In the illustrations, FIGS. 2A-2B represent cross-sectional views corresponding to FIG. 1A, and it will be appreciated that the layers 250$a$-$f$ extend into and out of the page. As illustrated in FIG. 2A, the layers 250$a$-$f$ may be placed in the structure 100 to fill the structure's volume from a second surface 220 to a first surface 210. This, for example, may be similar to the way in which the composite structure is fabricated. A first layer 250$a$ is first placed in a mold, a second layer 250$b$ is placed on the first layer, and so on. Alternatively as shown in FIG. 2B, the layers 250$a$-$f$ may be placed starting at the first surface 210 and "laying up" the layers to the second surface 220. For example, the mold may be inverted as shown in FIG. 2B. It can be seen from FIGS. 2A-2B that the configurations of the layers are different and depend on how the volume is filled.

Figure 2C:
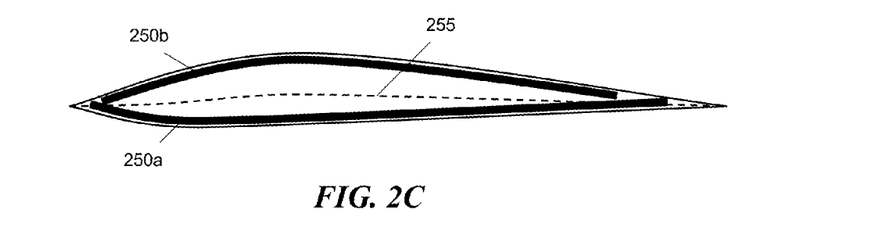
FIG. 2C depicts an embodiment in which design rules may have been specified for a design structure. As an example, a mid-surface 255 having particular properties may be specified. Additionally, a largest layer 250a and second largest layer 250b may be specified to lie along outer surfaces of the structure.

Each of the illustrated layer distributions in FIG. 2A and FIG. 2B may result in different mechanical and performance characteristics of the same composite structure. For example, the layer distribution shown in FIG. 2A exhibits predominantly flat layer configurations. This distribution of layers may provide greater flexibility in the Z direction along the length (Y) of the structure 100. (For example, it is easier to bend a stack of papers when they all lie flat.) The composite structure of FIG. 2A may have lower mechanical strength along its first surface 210 due to the agglomeration of smaller layers, and exhibit a rougher first surface 210 due to the multiple layer edges along that surface. A rough first surface 210 may be undesirable if the surface is wetted, i.e., exposed to an air flow or fluid flow. If material stresses or shear are concentrated along the structure's first surface 210, it may be undesirable to have smaller layers distributed near the top surface. The distribution of layers in FIG. 2B may provide higher flexural stiffness in the Z direction (bending a stack of papers that are curved is more difficult), greater mechanical strength along the first surface, and a smoother first surface 210. Other layer distributions, e.g. distributions in which smaller layers are interspersed within larger layers, may yield different mechanical and performance characteristics. For example, FIG. 2C illustrates a distribution in which the two largest layers 250a, 250b may be specified to lie on outer surfaces. Additionally, a mid-surface 255 may be specified to be a neutral surface, i.e., a surface between all points under compressive stress and all points under tensile stress when the composite structure is flexed along it's length. Accordingly, a design engineer may select a layer distribution within a composite structure to meet particular design and performance rules or constraints.

Although multilayer composites offer the prospect of tailoring a structure's mechanical properties and performance to meet design needs, the result is a cost in terms of complexity of designing the composite structure. For example, each layer can be varied in thickness, lateral extent, location, fiber composition, fiber pattern or weave, and resin composition, for example. Variability of these parameters can result in time-intensive and both manually and computationally intensive design tasks.

Filling a Composite Structure with Multiple Layers using Isocontours and Layer Transformation Guides In view of conventional computationally-intensive methods for multilayer design, the inventors have developed efficient numerical methods and systems that may be used to determine layer distributions within a composite structure. Additionally, the inventors have developed methods that reuse data from prior layer-distribution computations in determining a subsequent distribution. Reuse of data can significantly reduce the amount of time associated with "wasted" data, i.e., data which is calculated for one trial distribution during an iterative design process and then discarded because the solution may not meet a design criteria. In describing the inventive methods for multilayer design, reference is made generally to FIGS. 3A-3B, FIGS. 4A-4C, and FIG. 5, although it is to be recognized that the figures are for illustrative purposes only and not meant to limit the described methods in any way.

Figure 3A:
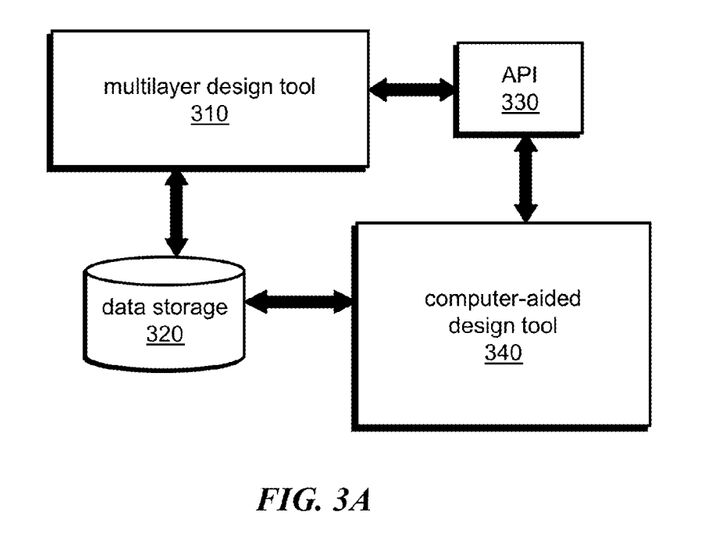
FIG. 3A illustrates an embodiment of a system in which a multilayer design tool 310 may operate. The multilayer design tool may be adapted to execute the method steps of FIG. 6.

FIG. 3A depicts an embodiment of a computing environment in which a multilayer design tool 310 may operate. The multilayer design tool 310 may comprise at least one processor (not shown in the illustration), e.g., a processor of a personal computer or workstation. The at least one processor may be local to the computer, or may be distributed in a local or wide area network. The multilayer design tool 310 may be in communication with a data storage device 320 and an application programming interface (API) 330. The API 330 may provide an interface for the exchange of data between a computer-aided design (CAD) tool 340 and the multilayer design tool 310. In exemplary implementations, the multilayer design tool 310 is configured to operate, via the API 330, in conjunction with the CAD tool 340. Design data representative of a composite structure may be defined with the CAD tool, and may be exported to the multilayer design tool for further processing. Data output from the multilayer design tool may be provided back to the CAD tool for display, storage, output, and/or additional processing. The data storage device 320 may comprise non-transitory storage medium, and may be a single storage device or multiple distributed storage devices of plural types, e.g., cache, RAM, ROM, SRAM, DRAM, etc. The data storage device 320 may store computer-executable instructions and/or data for any one of or any combination of the multilayer design tool 310, the API 330, and the CAD tool 340. In various implementations, the multilayer design tool 310 comprises computer-executable instructions that adapt at least one processor to execute the inventive process steps for determining layer distributions in multilayer structures as described below.

Figure 3B:
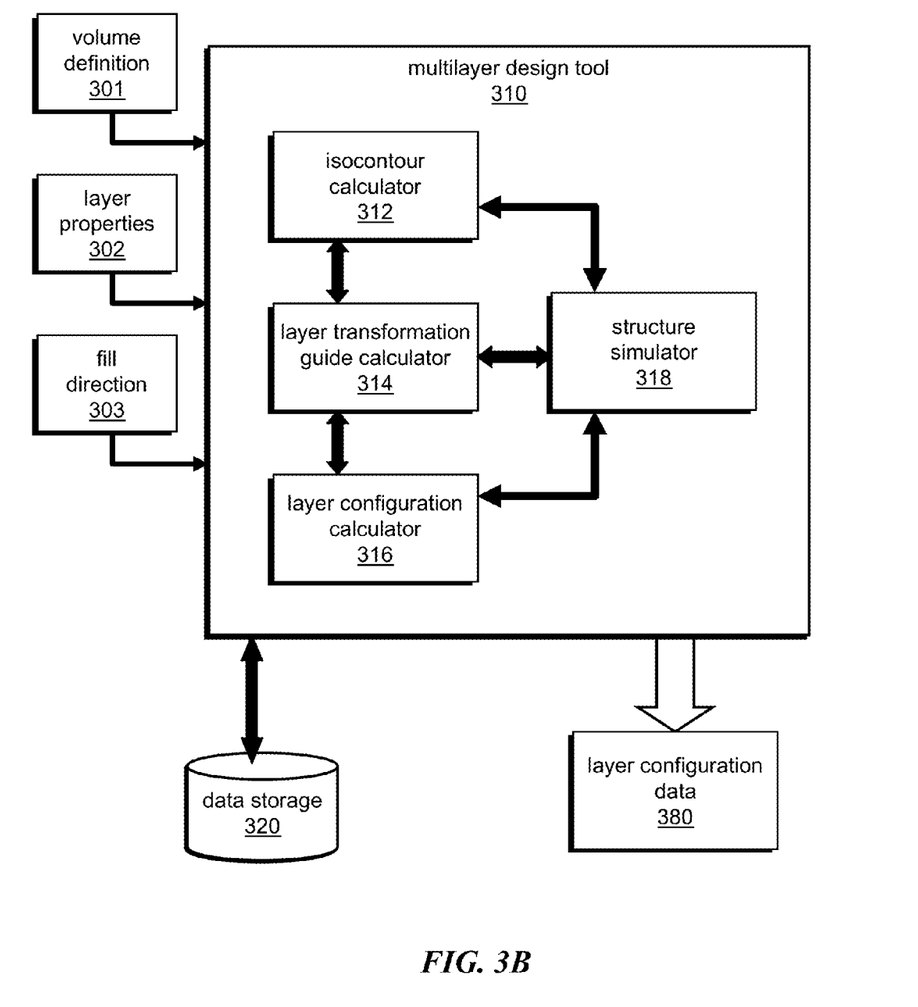
FIG. 3B represents further details of an embodiment of a multilayer design tool 310.

Further details of an embodiment of the multilayer design tool 310 are depicted in the block diagram representation of FIG. 3B. The multilayer design tool 310 may be configured to receive at least three types of input data. The multilayer design tool may further be adapted to receive additional data, such as design and/or performance constraints (not shown in the illustration). A first type of input data may comprise structure data or volume definition data 301. The volume definition data 301 may include any data necessary to define the dimensions and shape of the composite structure. For example, the volume definition data 301 may include distance measurements and/or equations which define the size and shape of the composite structure. The volume definition data may be received, for example, from the CAD tool 340, with which a suitable design for the structure is obtained, or the data may be received from the data storage 320, or directly from user input.

A second type of input data may comprise layer properties data 302. This data is representative of the multiple layers of composite material that will be used to fill the volume of the composite structure. This data may include, without limitation, the thickness of each layer to be used in forming a composite structure, the type of fabric used in making a layer, the fabric's weave, the type of matrix in which the fabric is embedded, e.g., polymer or resin type, glass/polymer or carbon/polymer mix, etc. The layer properties data 302 may also be received from the CAD tool 340, from data storage 320, and/or from user input.

A third type of input data may comprise fill direction data 303. This data may be received from the CAD tool 340, from data storage 320, and/or from user input, and define a direction in which the volume of the composite structure is to be filled with multiple layers of composite material. Referring again to FIGS. 2A-2C, a structure 100 may be filled in various directions. For example, the fill direction data 303 may comprise computer-readable instructions to fill a volume starting from a first outer surface 210, as shown in FIG. 2B, or starting from a second outer surface 220, as shown in FIG. 2A. In some implementations, fill direction data 303 may comprise computer-readable instructions to fill a volume starting at two outer surfaces and filling towards a midsurface 255, as suggested in FIG. 2C, or starting from a midsurface and filling to one or more outer surfaces.

The multilayer design apparatus 310 may further comprise an isocontour calculator 312, a layer transformation guide calculator 314, and a layer configuration calculator 316, each of which may be in communication with each other, directly or indirectly. These components may further be in communication with a structure simulator 318. Each of these components may be embodied in software, hardware, or a combination thereof. In operation, the isocontour calculator 312 may calculate pairs of isocontours 410*a*1,*a*2-*f*1,*f*2 (referring to FIG. 4A) for at least two surfaces of the composite structure based upon received input data 301-303. The layer transformation guide calculator 314 may use isocontour information to determine layer transformation guides 420*a-f*, may calculate the layer transformation guides independently from the isocontours, or may calculate the layer transformation guides interdependently with the isocontours. The structure simulator 318 may numerically simulate the composite structure for a selected order of layers within the structure, and the layer configuration calculator 316 may determine configuration data for each layer within the composite structure. The configuration data may be representative of the dimensions and shape of each layer within the structure. For example, the configuration data may be representative of a surface defined by a layer as it would be shaped within the composite structure. The configuration data and may also include "flat pattern" data for each layer. The flat pattern data may be used to guide the cutting of each layer from a flat sheet of material, so that the cut flat pattern conforms accurately to the layer's simulated configuration within the composite structure. In some implementations, layer configuration data 380 is provided as output, e.g., to a CAD tool for display, to an auxiliary data storage device or processor, or as data to be input to a layer cutting tool.

Figure 4A:
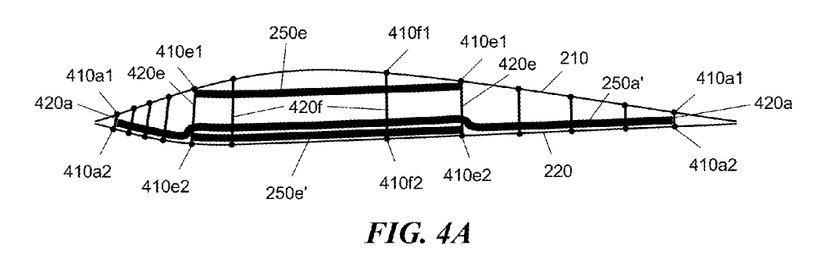
FIG. 4A depicts isocontours 410a1,2-f1,2 and layer transformation guides 420a-f.

In further detail, the isocontour calculator 312 may generate pairs of isocontours 410*a*1,*a*2-*f*1,*f*2 as described above in conjunction with a first filling of the composite structure. An approach to distributing layers within a composite structure for a first filling of the structure may comprise utilizing a method of progressive offsets. In this method, a first layer, e.g., layer 250*a* in FIG. 2A, is first placed within the structure's volume such that it extends from a first edge of the structure to a second edge of the structure. Dimensional and configuration data is then calculated for the layer. A second layer 250*b* is disposed adjacent to the first layer, and again extends to each edge of the design structure 100. Layers are then added successively in this manner to fill the structure. After the structure is filled with layers, the design may be checked for compliance with design constraints.

Although a first filling via a method of progressive offsets is often adequate for a first pass at designing the composite structure, it typically leads to an agglomeration of small layers at the end of the fill direction. This can be seen in FIG. 2A, where the structure is filled from the second surface 220 to the first surface 210. A concentration of small layers can result in a local weakening of the structure. Often it is necessary to reduce a concentration of small layers within the stack. This may entail moving one or more layers within the stack of layers after a first filling, or selecting one or more target positions for one or more layers.

Figure 4B:
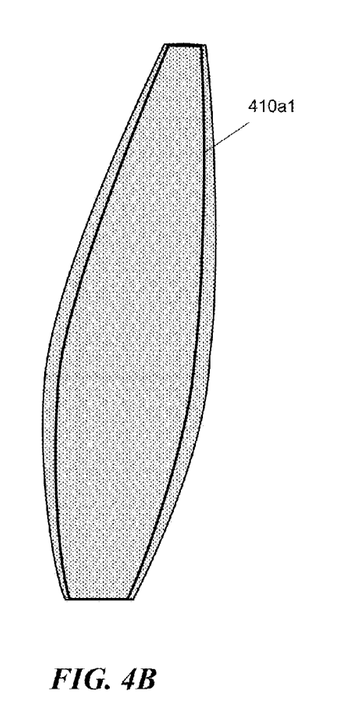
FIG. 4B depicts an isocontour 410a1 defined on a structure's surface.

As an exemplary but non-limiting embodiment, and referring to FIG. 2A and FIG. 4A-4B, isocontour pairs may be generated as layers 250*a-f* are first filled within a structure 100 from a second surface 220 to a first surface 210. In this embodiment, a first layer 250*a* is placed along the second surface 220 as shown in FIG. 2A, such that it extends along the second surface. Because of the layer's thickness, it will intersect the first surface 210 at a distance substantially equal the layer's thickness from the second surface. The intersection of the first layer 250*a* with the first surface 210 defines a loci of points, and may be used to define one isocontour 410*a*1 of a pair of isocontours 410*a*1, 410*a*2. (See also FIG. 4B.) The second isocontour 410*a*2 of the pair may be defined by a loci of points on the second surface 220 which are at a distance substantially equal to the layer's thickness from the isocontour 410*a*1 on the first surface, wherein the distance is measured along lines perpendicular to the second surface and intersecting the isocontour 410*a*1 on the first surface. As each layer 250*a-f* is added to the composite structure, a pair of isocontours may be calculated following this procedure. It will be appreciated that the isocontours on one surface are offset from the other surface by constant distances, and the constant distances correspond to a cumulative thickness of layers disposed between the isocontours. In exemplary implementations, the calculation of isocontours occurs once based on a defined volume during design of a composite structure.

Figure 4C:
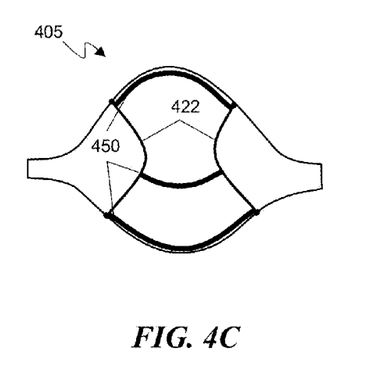
FIG. 4C depicts an embodiment of a layer transformation guide 422 in a structure 405, and shows variations of layer dimension and configuration as the layer 450 is placed at different locations within the structure.

In certain implementations, the isocontours may be used by the layer transformation guide calculator 314 to calculate layer transformation guides 420*a-f*. The layer transformation guide calculator 314 may generate layer transformation guides that comprise surfaces connecting the pairs of isocontours, as depicted in FIG. 4A. In some embodiments, the layer transformation guides 420*a-f* comprise shortest-distance lines connecting a pair of isocontours and distributed along the isocontours. The lines may be representative of a least-area surface connecting the pair of isocontours, and provide a suitable approximation to a continuous boundary that includes points of the lines. In some embodiments, the layer transformation guide may comprise a curved surface, or curved lines, 422 connecting isocontours as depicted in FIG. 4C. In certain implementations, the layer transformation guides 420*a-f* are calculated once during the design of a composite structure. In some embodiments, the layer transformation guides may be calculated more than once during a design phase of the composite structure.

In another exemplary but non-limiting embodiment, layer transformation guides 420*a-f* may be calculated prior to isocontours. As an example, layer transformation guides 420*a-f* may be generated according to a rule, e.g., each layer transformation guide is to extend perpendicularly from a first surface and terminate at a second surface. The first surface may be a top surface or a bottom surface. In reference to FIG. 4A, the first surface may be lower surface 220 or upper surface 210. A second constraint on the layer transformation guides 420*a-f* may be that they extend an integral number of layer thicknesses, e.g., their length is one, two, three, four, etc. layer thicknesses. In some implementations, the length of layer transformation guides may be determined by a cumulative total of layer thicknesses, e.g., in cases where layer thicknesses vary within a composite structure. In some embodiments, the direction of the layer transformation guides may be specified by a user, e.g., layer transformation guides are to be parallel to a direction specified by a user. The specified direction may be one direction, or may be a blending of different directions (e.g., a plurality of directions which vary depending on location within the composite structure). For some embodiments, the composite structure may be twisted along its length, such as occurs in a propeller blade. In such a structure, the layer transformation guides may vary in direction along the length of the structure representing a change in direction of translation along the length of the structure. In yet other embodiments, the layer transformation guides 420*a-f* may be curvilinear as depicted in FIG. 4C. In some implementations, curvilinear layer transformation guides 420*a-f* may be configured to be normal at each opposing surface of a composite structure. In such an implementation, the curvature of the layer transformation guides may be determined based upon the curvature of each surface. For example, a layer transformation guide may be given more curvature in a region closer to a first surface having greater curvature than a second surface. The isocontours may be calculated interdependently with each layer transformation guide, or calculated after the determination of layer transformation guides 420*a-f*.

The layer transformation guides 420*a-f* may comprise data structures representative of the surfaces or lines described above. For example, layer transformation guides may comprise a plurality of data points stored in at least one manufactured memory device (e.g., data storage 320) that define a three-dimensional surface connecting pairs of isocontours or extending from a first surface to a second surface of the composite structure. Alternatively, layer transformation guides may comprise a plurality of data points stored in a manufactured memory device that define a plurality of lines connecting pairs of isocontours or extending from a first surface to a second surface of the composite structure. In some implementations, layer transformation guides 420*a-f* may comprise data stored in at least one memory device defining mathematical expressions. The mathematical expressions may be used to generate at least a portion of a layer transformation guide, e.g., generate at least a portion of surfaces or lines connecting pairs of isocontours or extending from a first surface to a second surface of the composite structure. In some embodiments, the layer transformation guides 420*a-f* may comprise a combination of data points and mathematical expressions stored in at least one memory device. The layer transformation guides may be data stored in at least one non-transitory computer-readable medium. Similarly, the isocontours 410*a-f* may comprise data points and/or mathematical expressions stored in at least one manufactured memory device.

After or during the calculation of isocontours and layer transformation guides, the layer configuration calculator 316 may generate layer configuration data. The layer configuration data comprises data representative of the shape and size of each layer within the multilayer stack. The layer configuration calculator 316 may generate arrays of three-dimensional data points, e.g., x, y, z data points, defining positions of space that a layer passes through. The data points may be distributed on a fine mesh or coarse mesh representing a layer. The layer configuration calculator 316 may further generate functions that may be used to interpolate the shape of portions of a layer between three-dimensional data points. In certain implementations, the layer configuration calculator 316 generates "flat pattern" data, as described above, for each layer. The data generated by the layer configuration calculator may be provided to a structure simulator 318 and/or output as layer configuration data 380. In various implementations, the layer configuration data is provided to a data storage device 320 for subsequent retrieval and use.

The structure simulator 318 may receive data from any or all of the layer configuration calculator 316, the isocontour calculator 312, the layer transformation guide calculator 314, and the data store 320. The received data may be used to generate a simulated multilayer composite structure. In some embodiments, the structure simulator 318 may export data to the CAD tool 340 for displaying a graphical simulation of the composite structure. In some embodiments, the structure simulator 318 may process the received data, or provide it for further processing, so as to simulate in-use conditions for the structure. For example, mechanical loading, part mating, design constraint compliance, fluid dynamic and/or aerodynamic analyses may be carried out by the structure simulator or by at least one other processor on data provided by the structure simulator 318.

After a first filling of the composite structure by multiple layers 250*a-f*, it may be necessary to move one or more layers within the structure, e.g., to meet design constraints or specified performance characteristics. The need to move one or more layers may become evident from an analysis of the simulated structure.

In various embodiments, the layer transformation guides 420*a-f* may be used to determine the extent of a layer as it is moved within the stack of multiple layers, and to determine transformations of the shapes of layers. The use of the layer transformation guides for determining variation in layer size and configuration with movement in the stack can be better understood in reference to FIG. 4A. As an example, during a "first fill" of a volume, layer transformation guides 420*a-f* and isocontours 410*a-f* may be calculated as described above and illustrated in FIG. 2A. As shown in FIG. 4A, it may be desired to move at least one layer, for example layer 250*e*, from a position near the first surface portion 210 to a location near the second surface portion 220. The term "move" is used figuratively in this context, and refers to designating or selecting a similarly sized layer at a different position within the multilayer stack. Referring to FIG. 4A, the layer 250*e* would be removed (although shown in the drawing for reference) and similarly sized layer 250*e'* designated at a different position as indicated in the drawing. Configuration data for the layer 250*e'* may then be calculated.

Continuing with the example above in reference to FIG. 4A, the layer transformation guide 420*e* may be used in the computational process for determining configuration data for layer 250*e'*, as well as for determining configuration data for other layers, e.g., layer 250*a'*, affected by the relocation of the smaller layer 250*e*. As described in an embodiment above, during a first filling a layer transformation guide is defined and/or calculated for each layer in a multilayer stack. For example, layer transformation guide 420*e* is calculated for layer 250*e*. Once calculated for a particular design volume, the layer transformation guides 420*a-f* may not change even though layers may be shuffled within the multilayer stack. In this example, layer transformation guide 420*e* is used to at least determine the spatial extent or outer bounds of a layer similarly sized to layer 250*e* located at any elevation within the multilayer stack. In the illustrated embodiment, the layer transformation guide 420*e* has non-parallel sides, or lines, so that the size of layer 250*e* changes as it is relocated within the stack. When located near the second surface 220, at least the size of layer 250*e'* is different from the size of the layer 250*e* when located near the first surface 210. The shape of the relocated layer may also be different. Such variation in layer size and shape may be more evident in complex structures, such as the one illustrated in FIG. 4C. The layer transformation guides can then be used to determine the size or extent of any layer as it is moved or shuffled within the stack of composite layers.

The layer transformation guides 420*a-f* may also be used to determine transformations of the shapes of other layers within the multilayer stack. Referring again to FIG. 4A, layer 250*a'* picks up draping distortions as it must bend and conform over layer 250*e'*. The layer transformation guides may be used in the computation of layer configuration data to assign draping distortions to layers affected by relocation of one or more layers within the multilayer stack. As an example and referring to FIG. 4A, for a given fill direction (e.g., from surface 220 to 210), a layer L will be assigned 2N draping distortions, where N is the number of layers associated with layer transformation guides that are within the bounds of a layer transformation guide for layer L and that are relocated to an earlier or prior position in the layer filling order. The layer transformation guides may then be used to determine the number of draping distortions that a layer picks up and where the draping distortions occur within the layer.

A further advantage of using the layer transformation guides 420a-f is that layer configuration data from prior calculations may be reused to determine the shape of a layer relocated within the multilayer structure. The recycling of data can be understood in reference to FIGS. 2A and 4A. When a layer 250e is "moved" to a different location, e.g., along the second surface 220, data for the layer 250e' bounded by the layer transformation guide 420e need not be recalculated. Data for this region is available from prior-calculated layer configuration data for layer 250a that formerly occupied the region now occupied by layer 250e'. Accordingly, the layer configuration calculator may simply reuse or copy a portion of data for layer 250a that is bounded by the layer transformation guide 420e in calculating layer configuration data for the relocated layer 250e'.

Additionally, most of the layer configuration data for the moved layer 250a' is also available from the first calculation of layer configuration data. Layer 250a is moved, in part, to a prior position of a portion of layer 250b. The changed layer is shown as layer 250a' in FIG. 4A. As can be seen from the illustration, layer configuration data for former layer 250b bounded approximately by the layer transformation guide 420e may be reused as a portion of data for layer 250a'. Another portion of data for layer 250a' substantially comprises the prior calculated configuration data for layer 250a between the regions bounded by layer transformation guide 420e and guide 420a. At the layer transformation guide 420e, the layer 250a' picks up draping distortions. The draping distortions may comprise one or more selected draping distortion data sets representative of a double curvature shape. The one or more selected draping distortion data sets may be spliced into the recycled data from prior calculated configuration data for layers 250b and 250a in calculating layer configuration data for layer 250a'. The splicing may replace some of the prior calculated configuration data for layers 250b and 250a in the vicinity of the splicing so that the splicing does not result in discontinuities or abrupt transitions. In the example shown in FIG. 4A, two draping distortion data sets may be used, one for bending up and over the layer 250e', as seen on the left side, and one for bending back down from the layer 250e', as seen on the right side. In some implementations, a mirrored version of a draping distortion data set may be used for "bending up" and "bending down" distortions.

Figure 5:
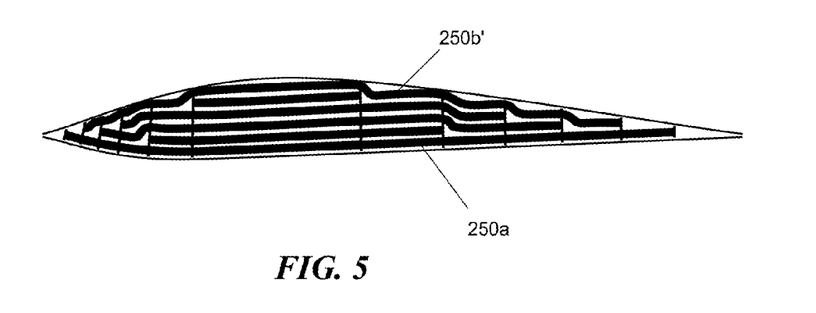
FIG. 5 depicts an embodiment in which two layers of the multilayer structure 100 have been moved within the multilayer stack. (Compare with FIG. 2A.) Draping distortions of upper layers are also illustrated.

It can be seen from FIG. 4A that 250a' undergoes draping distortions as it bends up and over and then back down from the relocated layer 250e'. The draping distortions may be calculated and accounted for in the layer configuration data for each layer that undergoes such distortions, one or more times. For example, any layer that is deflected over N layers may include in the layer configuration data an accounting for 2N draping distortions. FIG. 5 depicts a reordering of layers for the structure 100 in which layer 250b' undergoes eight draping distortions. A draping distortion may be proportional to the thickness of a layer over which a deflected layer bends, and may add a respective amount to a layer's dimensions to account for the draping distortion. As noted above, the layer transformation guides 420a-f may be used to determine where draping distortions must be added to layers within the composite structure.

It may be appreciated in view of the foregoing description of layer configuration calculations that most of the layer configuration data calculated during a first filling of the composite structure with multiple layers may be reused for subsequent layer configuration calculations when one or more layers are moved within the stack of layers. The recycling of prior calculated layer configuration data may significantly improve computational efficiency during a design phase and reduce computation time. In exemplary implementations, the layers may be identified during a first filling of the composite structure (e.g., numbered 1, 2, 3, 4, 5, 6 in FIG. 2A), and a reordering of layers may be carried out by simply providing a shuffled order of layer identifications for the multilayer design tool 310 (e.g., 1, 5, 3, 4, 6, 2 as depicted in FIG. 5). The layer transformation guides can be used to identify the spatial extent of each layer as it is moved within the stack and whether the layer picks up draping distortions, thereby eliminating a need to calculate from scratch new layer boundaries for each layer in a new layer ordering. The layer transformation guides can also be used to identify portions of layer configuration data for prior layers of prior layer distributions that can be reused to determine layer configuration data for the reordered layers, thereby eliminating a need to calculate layer configuration data from scratch for each layer in a new layer ordering.

In some embodiments, a structure may be subdivided into plural sub-volumes. For example, a more complex structure such as the one depicted in FIG. 4C may be divided into a number of sub-volumes. Each sub-volume may be treated separately in accordance with the methods described herein. Layer transformation guides and isocontours may be computed for each sub-volume. Layers may be filled and reordered within each sub-volume. The multilayer design tool 340 may be adapted to receive instructions to relocate at least one layer within one of the sub-volumes, and to reorder layers within the identified sub-volume and determine layer configuration data for the reordered layers. The multilayer design tool 340 may be adapted to compute layer configuration data for each sub-volume independently in some embodiments. The division of a structure into sub-volumes and subsequent computation may facilitate determination of layer configurations for complex structures.

Complex Shapes

The filling of a volume with layers of composite material may also include the filling of more complex shaped structures. For example, filling a volume may result in a self-intersecting layer covering both a first (e.g., lower) surface and at least a portion of a second (e.g., upper) surface by wrapping from the first surface and around one end of the volume onto the second surface. In such cases the layer is self-intersecting and may need to be shortened on either the first or second surface. The isocontours may provide "trim curves" to guide shortening of a layer on a first or second surface. In some implementations, it may be desirable to be able to alternate whether such trimming occurs on the first or second surface, and this may be achieved by alternating whether an isocontour of the first or second surface is used to trim the layer.

There may be further embodiments in which complex rearranging of the layers occurs. For example, a single layer may be wrapped multiple times or multiple layers may be wrapped once, such that one or more layers may overlap portions of other layers. The wrapping of layers may be carried out by suppressing or enabling isocontours such that layers become connected following rearrangement.

Method Embodiments

Figure 6:
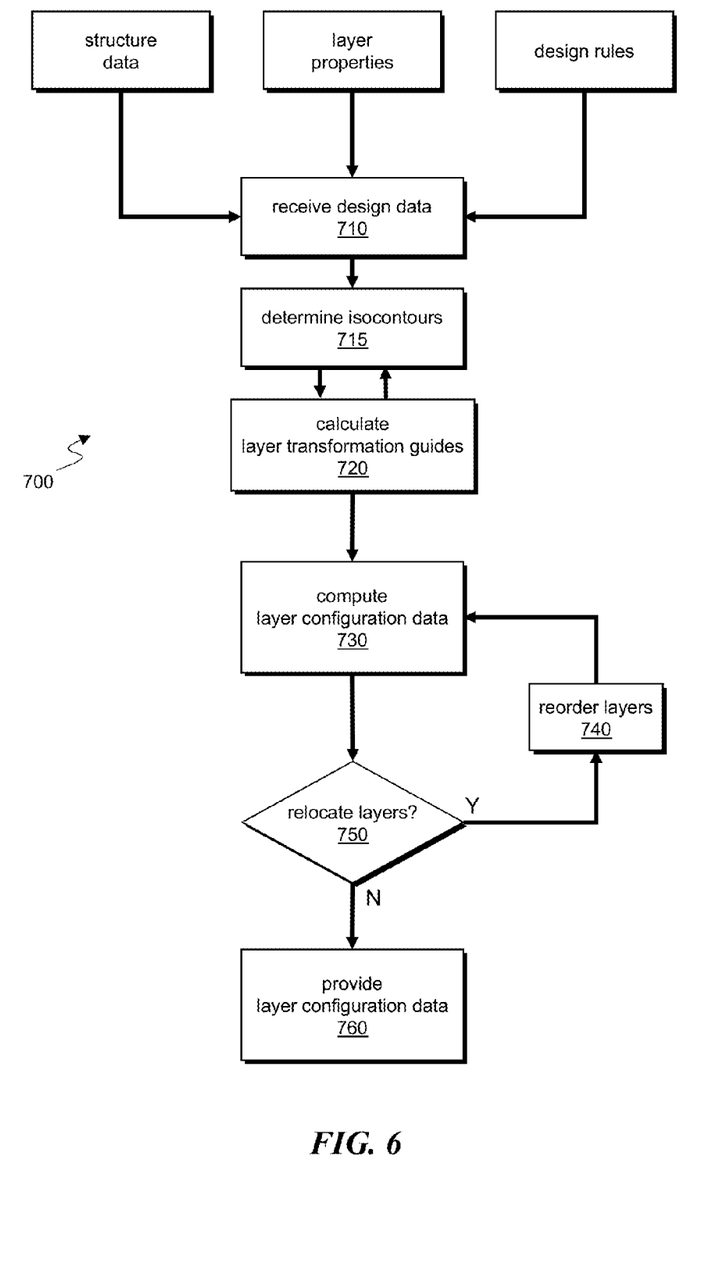
FIG. 6 is a flow chart of an embodiment of a method for designing a multilayer structure using isocontours and layer transformation guides.

An embodiment of a method 700 for determining a distribution of multiple layers for a composite structure is depicted in the flow diagram of FIG. 6. The method may be executed by at least one processor adapted to operate as a multilayer design tool 310 described above. Embodiments of the methods for determining a distribution of multiple layers to fill a composite structure may comprise computer-executable instructions encoded on non-transitory computer readable media.

The embodied method 700 may comprise a step of receiving 710 design data. The design data may include, without being limited to, structure data, layer properties, and design rules. The structure data may define the size and shape of the composite structure. The layer properties may include at least one or more parameters as described above which characterize each of the layers to be used in filling the structure. The design rules may include a fill direction, or a plurality of fill directions when a structure is partitioned into a plurality of sub-volumes, and may further include rules specifying locations of certain layers within the structure (e.g., locations of large layers, small layers, layers of specific composite materials, etc.), desired mechanical properties of the composite structure, and/or desired aero- or fluid-dynamic properties of the structure. The design rules may specify a mid-surface of the composite structure and at least one property associated with the mid-surface. In various embodiments, at least a portion of the design data may be received 710 from a CAD tool 340.

The method 700 may include steps of determining 715 isocontours and calculating 720 at least one layer transformation guide for the composite structure. Embodiments of determining isocontours and layer transformation guides for a structure are described above in connection with FIGS. 4A-4B. In certain implementations, isocontour pairs are calculated and used to calculate a layer transformation guide for each isocontour pair. Alternatively, layer transformation guides may be calculated and used to calculate isocontour pairs. Further, layer transformation guides and isocontour pairs may be calculated interdependently. There may be one layer transformation guide calculated for each layer of the multilayer stack, and each layer transformation guide may identify dimensions of a respective layer disposed at plural locations within the multilayer structure. In some embodiments, there may be multiple layer transformation guides (e.g., a plurality of shortest-distance lines or curves associated with an isocontour pair and calculated for each layer). The steps of determining 715 isocontours and calculating 720 at least one layer transformation guide may comprise dividing an outer surface of the composite structure into a first portion 210 and a second portion 220.

The method 700 may further comprise a step of computing 730 layer configuration data for each of the layers distributed within the composite structure. The layer configuration data may be representative of the dimensions and shape of each layer and additionally include "flat pattern" dimensions, as described above. The steps of determining 715 isocontours, calculating 720 layer transformation guides, and computing 730 layer configuration data may be executed during or after a first filling of a composite structure with multiple layers of composite material. The first filling may be done according to a method of progressive offsets, or may be done in any manner suitable for filling the volume. The step of computing 730 layer configuration data may be executed multiple times in the process of designing a multilayer composite structure.

The step of computing 730 layer configuration data may comprise using the isocontours and layer transformation guides as aids in the calculation of new layer configuration data, and reusing at least a portion of previously calculated layer configuration data that is representative of a prior distribution of layers within the structure. The step of computing 730 layer configuration data may further comprise calculating an increase in size of at least one layer due to a draping distortion of the layer.

The method may include a step of analyzing (not shown) the composite structure after a layer distribution is determined and layer configuration data is calculated. The analyzing may be automated, semi-automated, or manual. For example, the analyzing may comprise checking, by the multilayer design tool 310 or by a design engineer, whether certain layers are disposed in accordance with design rules, or whether the layer distribution meets mechanical, fluid dynamic, and/or aerodynamic specifications supplied with the design rules.

The method 700 may further comprise receiving instructions and determining 750 whether to relocate one or more layers within the stack, and reordering 740 the layers in accordance with the instructions. The instructions to relocate layers may be received from user input or from the multilayer design tool 310 when it has been determined that a candidate distribution of layers does not comply with design rules or performance specifications.

The steps of receiving 750 instructions to relocate one or more layers, reordering 740 layers, computing layer configuration data 730, and analyzing may be executed multiple times during a design phase for a composite structure. For example, the design process may be iterative, in which relocating one or more layers and recalculating layer configuration data is iterated until a suitable layer distribution is achieved. When a suitable layer distribution is obtained, e.g., a distribution for which the composite structure meets most or all of the design rules, the method 700 may comprise providing 760 layer configuration data for the multiple layers as output for use in further simulating performance of the composite structure, viewing the composite structure, storing the data, cutting the individual layers, and/or manufacturing the structure.

Hardware/Software Implementations

The above-described embodiments of the present invention may be implemented in any of numerous ways. For example, the embodiments may be implemented using hardware, software or a combination thereof. When implemented in software, the software code may be executed on any suitable processor or collection of processors, whether provided in a single computer or distributed among multiple computers. In various embodiments, the software adapts the processor or collection of processors to carry out one or more steps of the embodiments.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, e.g., an electronic instrument adapted for design purposes, a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, touch screens, data ports, and digitizing tablets. As another example, a computer may receive input information through speech recognition or in other audible format. Input and output devices may be used to receive and provide data.

Computers adapted for carrying out embodiments of the invention may be interconnected by one or more networks in any suitable form, including as a local area network, a medium area network, or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language or intermediate code that is executed on a framework or virtual machine.

In this respect, the invention may be embodied as non-transitory computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media may be transportable, such that the program or programs stored thereon may be loaded onto one or more different computers or other processors to implement various aspects of the present invention as discussed above. As used herein, the term "non-transitory computer-readable storage medium" encompasses only a computer-readable medium that may be considered to be a manufacture (i.e., article of manufacture) or a machine.

The terms "program" or "software" are used herein in a generic sense to refer to any type of computer code or set of computer-executable instructions that may be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts substantially simultaneously, even though shown as sequential acts in illustrative embodiments. As an example, two or more acts shown as consecutive may be executed on separate computational threads running in parallel.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

We claim:

1. A method executed by at least one processor, the at least one processor adapted to carry out process steps comprising:
    receiving design data defining dimensions of a multilayer structure;
    receiving parameter data defining at least one layer parameter of at least one layer of multiple layers to form the multilayer structure;
    calculating at least one layer transformation guide, the layer transformation guide identifying at least one configuration parameter of the at least one layer disposed at any one of a plurality of locations within the multilayer structure;
    receiving instructions to relocate the at least one layer within the multilayer structure; and
    determining layer configuration data for the at least one layer based on the instructions to relocate and the at least one layer transformation guide, the layer transformation guide specifying a lateral boundary of the at least one layer as the at least one layer is relocated within the multilayer structure.

2. The method of claim 1, wherein the at least one layer transformation guide comprises layer transformation guide data stored in at least one non-transitory computer readable medium, the layer transformation guide data representative of an element selected from the following group or a combination thereof: a surface, a plurality of lines, one or more mathematical expressions for generating a surface, and one or more mathematical expressions for generating a plurality of lines.

3. The method of claim 1, wherein the at least one layer transformation guide is calculated such that it extends perpendicularly from a first surface of the multilayer structure to a second surface of the multilayer structure and has a length of plural layer thicknesses.

4. The method of claim 1, wherein the act of determining comprises using the at least one layer transformation guide to identify a spatial extent of the at least one layer relocated to each of the plural locations.

5. The method of claim 1, wherein the act of determining layer configuration data comprises using the at least one layer transformation guide to identify at least one draping distortion for another layer within the multilayer structure.

6. The method of claim 1, wherein the act of determining layer configuration data comprises using the at least one layer transformation guide to identify a portion of a previously calculated layer configuration data that may be reused as at least a portion of layer configuration data for the at least one layer.

7. The method of claim 1, wherein the step of calculating further comprises:
dividing an outer bounding surface of the multilayer structure into at least a first surface portion and a second surface portion; and
identifying on the first surface portion and second surface portion pairs of isocontours defining loci of constant distances between the first surface portion and the second surface portion, wherein each isocontour is represented by data stored in at least one non-transitory computer-readable medium.

8. The method of claim 7, wherein the at least one layer transformation guide comprises data representative of a surface joining a first isocontour and a second isocontour of one pair of the pairs of isocontours.

9. The method of claim 7, wherein the at least one layer transformation guide comprises data representative of lines or curves connecting to a first isocontour and a second isocontour of one pair of the pairs of isocontours.

10. The method of claim 7, wherein a spacing between consecutive pairs of isocontours is representative of a respective layer thickness, the respective layer being associated with one of the consecutive pairs of isocontours.

11. The method of claim 7, wherein one pair of isocontours is defined for the at least one layer.

12. The method of claim 11, wherein a first isocontour of the one pair of isocontours is defined by a first intersection of the at least one layer transformation guide with the second surface portion of the outer surface.

13. The method of claim 12, wherein a second isocontour of the one pair of isocontours is defined by a second intersection of the at least one layer transformation guide with the first surface portion of the outer surface, the at least one layer transformation guide extending from the first isocontour and being substantially normal to the first surface portion.

14. The method of claim 1, wherein the determining layer configuration data further comprises determining layer configuration data for all layers relocated within the multilayer structure responsive to the relocation of the at least one layer.

15. The method of claim 14, wherein the step of determining further comprises reusing a portion of previously calculated layer configuration data representative of a prior distribution of the multiple layers within the multilayer structure.

16. The method of claim 14, the step of determining further comprising calculating an increase in size of at least one of the multiple layers due to at least one draping distortion of the at least one of the multiple layers.

17. The method of claim 14, further comprising providing layer configuration data representative of configurations of all layers to a data store and/or visually displaying the layer configuration data.

18. The method of claim 14, further comprising providing flat-pattern dimensional data for the at least one layer, the flat-pattern dimensional data being representative of the at least one layer disposed on a flat surface and usable as a guide to cut the at least one layer from a flat sheet of material.

19. The method of claim 1, further comprising receiving data specifying at least one mid-surface of the multilayer structure and at least one property associated with the at least one mid-surface.

20. The method of claim 1, wherein the design data is received from a computer-aided drawing tool.

21. The method of claim 1, wherein the design data defines a volume of the multilayer structure.

22. The method of claim 1, wherein the at least one layer parameter comprises an element selected from the following group: thickness, material composition, fiber pattern, and a fiber direction.

23. A non-transitory computer storage medium encoded with computer-executable instructions, such that when executed the computer-executable instructions adapt an apparatus to execute process steps, the process steps comprising:
dividing an outer bounding surface of a multilayer structure into at least a first surface portion and a second surface portion;
calculating data representative of at least one layer transformation guide, the at least one layer transformation guide extending from the first surface portion to the second surface portion, the at least one layer transformation guide identifying plural configuration parameters of at least one layer of the multilayer structure, each of the plural configuration parameters corresponding to one of plural locations of the at least one layer within the multilayer structure; and
defining data representative of pairs of isocontours on the first surface portion and the second surface portion, each isocontour on the first surface portion associated with a corresponding isocontour on the second surface portion and each pair defining loci of constant distances between the first surface portion and the second surface portion, and wherein
the apparatus comprises at least one processor configured to access at least one manufactured storage device and wherein the multilayer structure comprises plural layers of composite material.

24. The computer storage medium of claim 23, wherein each layer transformation guide is disposed between corresponding isocontours of each pair of isocontours.

25. The computer storage medium of claim 23, further comprising computer-executable instructions to adapt the apparatus to execute process steps for:

receiving instructions to relocate the at least one layer within the multilayer structure; and determining layer configuration data for the relocated at least one layer based on the instructions to relocate and the at least one layer transformation guide.

26. The computer storage medium of claim 25, wherein the determining further comprising calculating an increase in size of the at least one layer due to a draping distortion.

27. The computer storage medium of claim 25, further comprising computer-executable instructions to adapt the apparatus to execute process steps for:

determining layer configuration data for all layers relocated within the multilayer structure responsive to the relocation of the at least one layer using at least one layer transformation guide.

28. The computer storage medium of claim 27, wherein the step of determining further comprises reusing a portion of previously calculated layer configuration data representative of a prior distribution of the plural layers.

29. The computer storage medium of claim 25, further comprising computer-executable instructions to provide an application programming interface for executing the process steps in conjunction with a computer-aided design tool.

30. The computer storage medium of claim 25, further comprising computer-executable instructions to adapt the apparatus to execute process steps for:

receiving design data from a computer-aided design tool defining dimensions of the multilayer structure; and receiving parameter data defining at least one layer parameter of each of the plural layers.

31. The computer storage medium of claim 30, further comprising computer-executable instructions to adapt the apparatus to execute process steps for providing layer configuration data representative of a configuration of the at least one layer to a data store and/or displaying visually the layer configuration data.

32. The computer storage medium of claim 30, further comprising computer-executable instructions to adapt the apparatus to execute process steps for providing flat-pattern dimensional data for the at least one layer, the flat-pattern dimensional data being representative of the at least one layer disposed on a flat surface and usable as a guide to cut the at least one layer from a flat sheet of material.

33. A method for designing a multilayer structure comprising plural layers of composite material, the method executed by a multilayer design tool having at least one processor adapted to carry out process steps comprising:

partitioning a shape representative of the multilayer structure into plural sub-volumes;

calculating a plurality of layer transformation guides for each one of the plural sub-volumes, each layer transformation guide associated with one layer of the multilayer structure;

receiving instructions to relocate a selected layer within one of the plural sub-volumes; and determining layer configuration data for all layers moved within the one of the plural sub-volumes responsive to the relocation of the selected layer, the determining based on the instructions to relocate and layer transformation guides associated with the layers moved, and wherein the at least one processor of the multilayer design tool is in communication with at least one storage medium and the layer transformation guides define approximately the lateral spatial extent of respective layers moved within the multilayer structure.

34. The method of claim 33, wherein the determining further comprises reusing a portion of previously calculated layer configuration data representative of a prior distribution order of layers within the one of the plural sub-volumes.

35. The method of claim 33, wherein the determining further comprises calculating an increase in size of at least some of the layers moved due to a draping distortion of the at least some of the layers.

36. The method of claim 33, further comprising providing layer configuration data representative of configurations of all layers within the one of the plural sub-volumes to a data store and/or visually displaying the layer configuration data.

37. The method of claim 33, further comprising providing flat-pattern dimensional data for the selected layer, the flat-pattern dimensional data being representative of dimensions of the selected layer disposed on a flat surface and usable as a guide to cut the selected layer from a flat sheet of material.

* * * * *